United States Patent
Monereau et al.

[11] Patent Number: 6,051,052
[45] Date of Patent: Apr. 18, 2000

[54] PROCESS FOR THE SEPARATION OF GASEOUS MIXTURES BY ADSORPTION WITH PRESSURE VARIATION

[75] Inventors: Christian Monereau, Paris; Philippe Andreani, Le Kremlin Bicetre; Pierre Petit, Buc, all of France

[73] Assignee: L'Air Liquide, Societe Anonyme pour l'Etude et l'Exploitation des Procedes Georges Claude, Paris Cedex, France

[21] Appl. No.: 08/970,431

[22] Filed: Nov. 14, 1997

[30] Foreign Application Priority Data

Nov. 15, 1996 [FR] France ................................. 96 13968

[51] Int. Cl.$^7$ ................................................ B01D 53/047
[52] U.S. Cl. ........................... 95/97; 95/104; 95/130
[58] Field of Search .................... 95/96–98, 100–105, 95/130; 96/108, 109, 115, 130, 144

[56] References Cited

U.S. PATENT DOCUMENTS

| | | | |
|---|---|---|---|
| 3,155,468 | 11/1964 | de Montgareuil et al. | 95/130 X |
| 4,013,429 | 3/1977 | Sircar et al. | 95/101 |
| 4,021,210 | 5/1977 | Streich et al. | 95/100 |
| 4,194,890 | 3/1980 | McCombs et al. | 95/98 X |
| 4,519,813 | 5/1985 | Hagiwara et al. | 95/130 X |
| 4,561,865 | 12/1985 | McCombs et al. | 95/96 |
| 4,581,044 | 4/1986 | Uno et al. | 95/96 |
| 4,784,672 | 11/1988 | Sircar | 95/97 |
| 4,816,039 | 3/1989 | Krishnamurthy et al. | 95/97 |
| 4,981,499 | 1/1991 | Hay et al. | 95/100 |
| 5,032,150 | 7/1991 | Knaebel | 95/98 X |
| 5,226,933 | 7/1993 | Knaebel et al. | 95/96 |
| 5,228,888 | 7/1993 | Gmelin et al. | 95/96 |
| 5,246,676 | 9/1993 | Hay | 95/98 X |
| 5,248,320 | 9/1993 | Garrett et al. | 95/96 |
| 5,370,728 | 12/1994 | LaSala et al. | 95/101 |
| 5,403,385 | 4/1995 | Pan | 95/100 |
| 5,407,465 | 4/1995 | Schaub et al. | 95/130 X |
| 5,505,765 | 4/1996 | Kaji et al. | 95/100 |
| 5,518,526 | 5/1996 | Baksh et al. | 95/101 X |
| 5,601,634 | 2/1997 | Jain et al. | 95/130 X |
| 5,620,501 | 4/1997 | Tamhankar et al. | 95/96 X |
| 5,658,371 | 8/1997 | Smolarek et al. | 95/101 |
| 5,679,134 | 10/1997 | Brugerolle et al. | 95/130 X |
| 5,702,504 | 12/1997 | Schaub et al. | 95/101 |
| 5,735,938 | 4/1998 | Baksh et al. | 95/101 |
| 5,772,737 | 6/1998 | Andreani et al. | 95/130 X |

FOREIGN PATENT DOCUMENTS

| | | |
|---|---|---|
| 0 450 785 | 10/1991 | European Pat. Off. . |
| 2 337 754 | 2/1974 | Germany . |
| 34 33 058 | 3/1986 | Germany . |

*Primary Examiner*—Robert H. Spitzer
*Attorney, Agent, or Firm*—Young & Thompson

[57] ABSTRACT

A separation process, involving an adsorber containing at least one adsorbent with an inlet and outflow, involves the following stages of the cycle:—stage I, repressurization from the low pressure of the cycle;—stages II and III during one of which the high pressure of the cycle is reached; and stage IV, depressurization/purging, during which the low pressure of the cycle is reached. Each stage (I to IV) involves a fixed gas flow (F) at one end of the adsorber and a free gas flow ($\lambda$) at the other end of the adsorber, the fixed flows (F) addressing the inlet (E) and outlet (F) ends of the adsorber from one stage (I to IV) to the next. The process is particularly applicable to the production of oxygen from air.

21 Claims, 2 Drawing Sheets

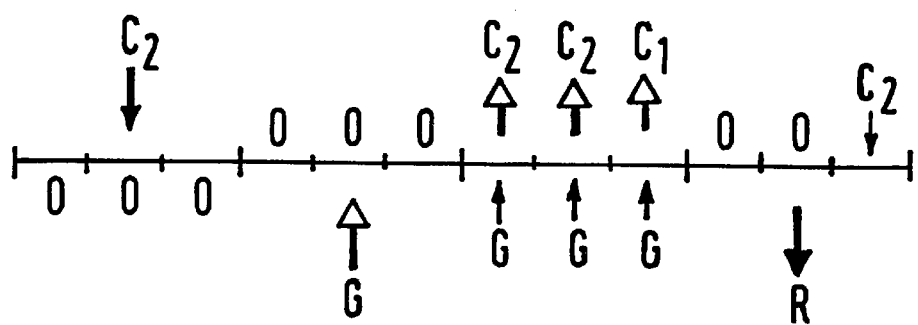
FIG.3
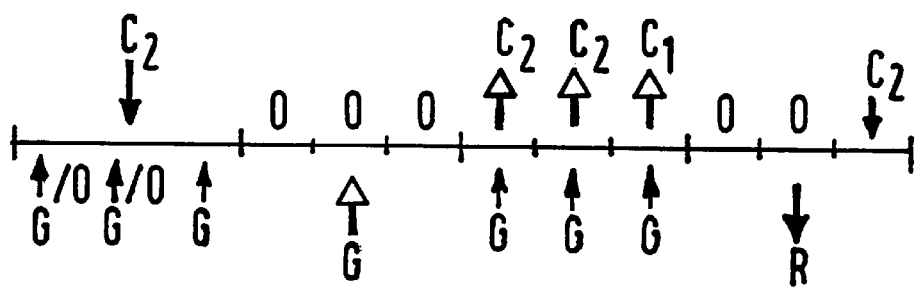
FIG.4
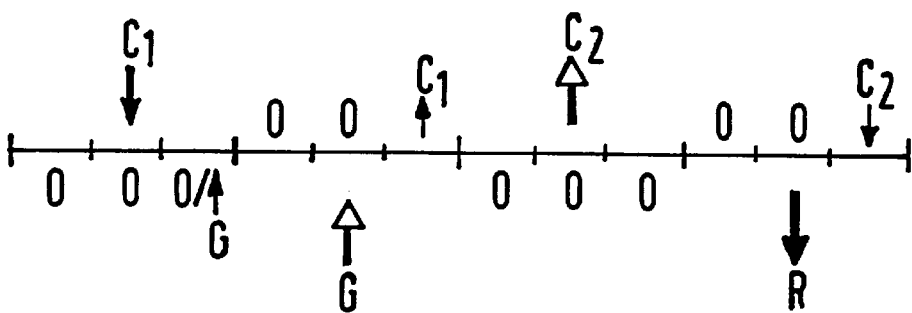
FIG.5
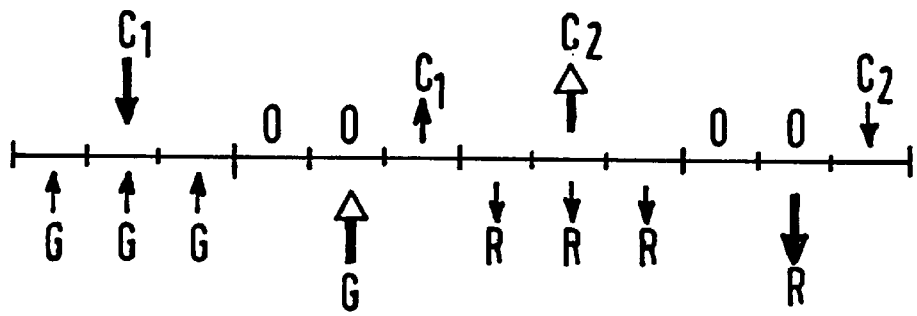
FIG.6
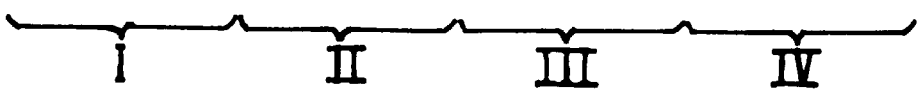

PROCESS FOR THE SEPARATION OF GASEOUS MIXTURES BY ADSORPTION WITH PRESSURE VARIATION

FIELD OF THE INVENTION

The present invention concerns the processes for the treatment, by separation, of gaseous mixtures using adsorption with pressure variation.

BACKGROUND OF THE INVENTION

In the Processes for the Separation of gaseous mixtures by Adsorption (PSA), a large number of installation architectures and implementation cycles have been proposed.

For the production of oxygen from air, only, the number of adsorbers ranges from 1 to more than 4 and the adsorbent materials are selected from an extensive range. The variants of the cycles are particularly numerous.

The multiplication and coexistence of all these processes and architectures may be explained by taking into account the various financial parameters influencing the production costs for the gas or gases to be separated over production capacity intervals (which may vary over a range, the extremes of which have a ratio of 1 to 200), energy costs (which may vary by a factor of 1 to 6, depending on the country and purchasing conditions) and, lastly, the capital expenditures on the installations themselves.

Thus, between a large unit in a country where energy is expensive and a small unit in a country where energy is cheap, the cost of the electricity consumed, expressed relative to the production cost may vary, in the specific case of oxygen, from over 70% to less than 10%. It ensues that a given process and/or a given installation architecture will never be optimal over the entire range of potential custom. The tendency is therefore to select the process and/or architecture most suitable for a customer and/or a precise use in an 'on-request' approach. Such an approach is already not very economical for relatively large units, but becomes prohibitive for small units or low-capacity units when the capital expenditure becomes preponderant and of considerable magnitude in absolute terms.

There is therefore a need to offer standard processes and installations that may nonetheless be adapted, particularly to local energy costs, in order to approach the optimal conditions usually achieved by the implementation of 'tailor-made' processes and installations, particularly for the range of medium-capacity units which typically produce less than 30 or 40 tons of oxygen per day.

SUMMARY OF THE INVENTION

The aim of the present invention is to propose a simple and flexible process, enabling a simple, basic and inexpensive installation, with optimization of the operating conditions to promote, in particular, either productivity or cost-effective energy use.

In order to do so, in accordance with a feature of the invention, the process of gas mixture separation by adsorption under pressure variation in an adsorber containing at least one adsorbent and with an inlet and outlet, exploiting a repetitive cycle, involves the following successive stages:

stage I, repressurization from the low pressure of the cycle, stages II and III, during one of which the high pressure of the cycle is reached, stage IV, depressurization/purging, during which the low pressure of the cycle is reached, in which each stage (I to IV) involves a fixed gas flow at one end of the adsorber and a free gas flow at the other end of the adsorber, the fixed flows addressing, in alternation, the inlet and outlet ends of the adsorber from one stage (I to IV) to the next one.

A further objective of the present invention is to offer an installation suitable for implementation of the process, consisting in an installation for process implementation as per one of the above claims, consisting in an adsorber containing at least one adsorbent with an inlet and outlet end, at least one capacity connected, via at least one valve device, to the outlet, the inlet being connected to at least one volume of gas mixture for separation and at least one gas receiver volume by at least one flow transfer device, and synchronized, programmable command facilities for the valve devices and transfer device, enabling operation in accordance with at least two different cycles.

BRIEF DESCRIPTION OF THE DRAWINGS

Other characteristics and advantages of the present invention will emerge from the following description of the methods of implementation, given illustratively but in no way limitatively, in relation with the drawings appended, of which:

FIGS. 3 to 6 are examples of implementation of the cycles that may be obtained with an installation as per FIG. 1.

DETAILED DESCRIPTION OF THE INVENTION

Figure 1:
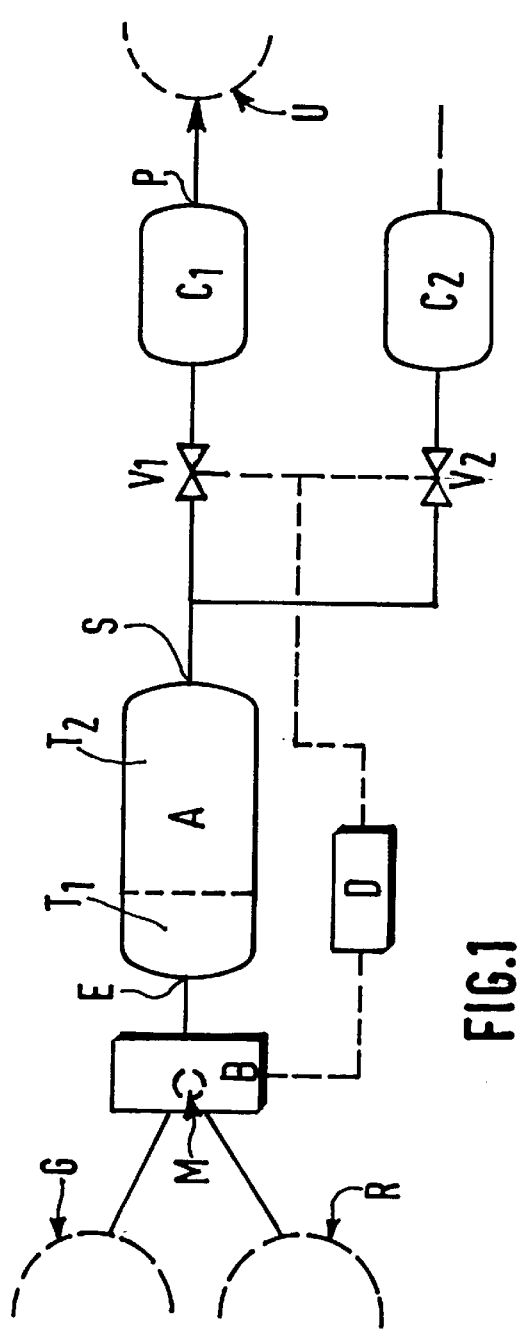
FIG. 1 is an outline of the installation for implementation of the processes as per the invention.

FIG. 1 shows an installation for the processing, by separation, of a gaseous mixture as per the invention. The installation basically consists in an adsorber, A, containing at least one adsorbent bed, T1, T2, and an inlet, E, for the gaseous mixture to be separated, and an outlet, S, for the separated gaseous mixture.

Here, as in the rest of the description, the concepts 'inlet' and 'outlet' refer to the normal flow directions for the gases during the adsorption phases.

The outlet, S, of adsorber, A, is connected to an initial capacity, $C_1$, and a second capacity, $C_2$, via valve devices, $V_1$, $V_2$, respectively.

At least the initial capacity, $C_1$, contains a gas outlet, P, typically to supply separated or purified gas to a user station or circuit, U.

Optionally, the second capacity, $C_2$, may also have a gas outlet for external use.

The inlet, E, of adsorber, A, is connected, via a flow transfer device, B, to at least one volume of the gas to be separated, G, feeding the adsorber with gas to be separated, and at least one gas receiver volume, R, to receive the residual gas in the desorption or adsorber purging phase. The transfer device, B, is a flow transfer system between adsorber, A, and volumes, G, and, R, and, possibly, between the latter, irrespective of the gas pressures available in those volumes. Thus, if the gaseous mixture for separation in volume, G, is at a pressure suitable for the separation process, the transfer between volume, G, and adsorber, A, will occur via a circuit fitted with valves, without transiting by a rotary compressor.

In the same way, if the pressure of the volume of receiver gas, R, is compatible with the process, gas transfer from the adsorber to volume, R, will occur via a circuit fitted with valves, without transiting by the rotary pump.

This will be the case, for example, for separation of oxygen and nitrogen from air on a site equipped with a compressed-air network and/or a vacuum network.

Conversely, in the more frequent cases where the volumes, G and R, are at pressures that cannot be immediately exploited by the process, the transfers towards and/or from the adsorber, A, will occur via a rotary machine M acting as compressor and/or pump.

In that case, the volumes, G and R, generally of high-capacity, may be the same (for example, environmental air for separation of the constituents of environmental air).

An example of such a system with distribution valves and a continuously-operating rotary machine is given in document U.S. Pat. No. 4,561,865 (McCombs et al.) and, with a two-way rotating machine, in European patent application 96 401045.8, in the present assignee's name.

As per the invention, as it is now going to be described in greater detail with respect to examples of the cycles, the installation also includes a synchronized command and control system, D, for the valve devices, $V_1$ and $V_2$, and the transfer device, B.

System D may be pre-programmed for at least two different cycles or programmed on site for implementation of at least two different types of cycle suitable for the specific operating conditions. Cycle changes may be made manually or automatically, in accordance with certain priority criteria, for example, the nominal or peak production capacity required, the purity required and/or the hourly electricity costs.

Figure 2:
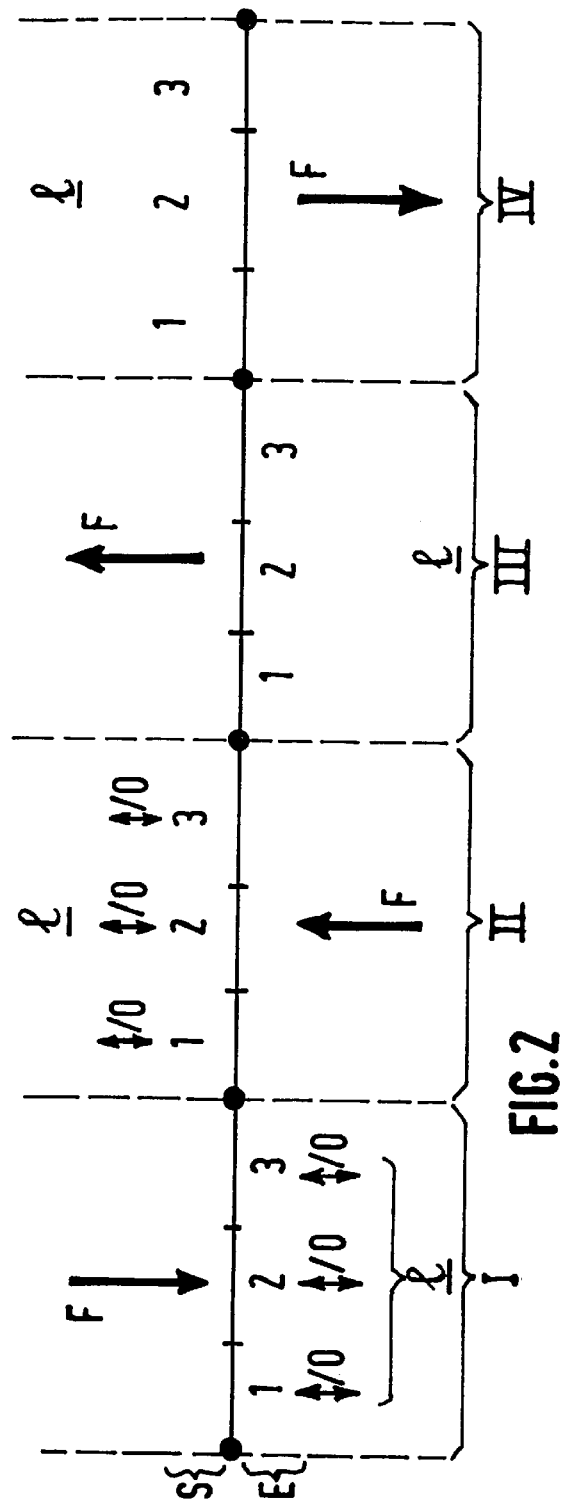
FIG. 2 is a diagram summarizing the stages and sub-stages of the processes as per the invention.

As per one aspect of the invention, as shown diagrammatically in FIG. 2, such a device enables implementation of a cycle format involving four stages, I to IV, in which each stage includes, at one end of the adsorber, a fixed flow F and, at the other end of the adsorber, a free flow t, determined as a function of the site operating and economic conditions.

This cycle format enables great flexibility in implementation, while restricting the complexity of the programming of system D.

'Fixed flow' (F) is taken to mean a flow of gas occurring, at one end of the adsorber, as shown by the thick arrows, F, in FIG. 2, in the same direction (inlet or outlet), throughout the duration of a stage in the cycle.

'Free flow' ($\lambda$) is taken to mean a flow such that the circulation, at one end of the adsorber, may be, depending on the sub-stages of the stage, in one direction, nil, or in the other direction, as shown by the double-arrow/O symbols in FIG. 2.

In order to offer a range of cycles appropriate to the required conditions of use, each stage, I to IV, is subdivided into at least two, more typically three, sub-stages, with the duration of each sub-stage being adjustable independently, from one stage to the next, and in a given stage. To simplify the explanation, the following examples of sub-stages will all have the same duration.

As per the invention, to enable the maximum number of operationally-interesting cycles to be implemented, each cycle consists of stage I, repressurization from the low pressure of the cycle, stages II and III, during which the high pressure of the cycle is reached, and stage IV, depressurization/purging, during which the low pressure of the cycle is reached, and the fixed flows, F, address, in alternation, the inlet end, E, and outlet end, S, of the adsorber from one stage I to IV to the next.

As per one aspect of the invention, for the processing (separation/purification) of a gaseous mixture mainly consisting of nitrogen and oxygen, the total duration of the four stages, I to IV, of the cycle is typically, for industrial applications, between 20 and 200 seconds.

More specifically, as shown in FIGS. 2 to 6, the fixed flows are inlets for stages I and II and outlets for stages III and IV.

Even more specifically, stage I consists in a fixed flow from at least one of the capacities, Ci, entering, by counterflow, through outlet S, for a recompression phase, and stage II consists in a fixed flow from volume G of the gaseous mixture to be separated, entering, by co-flow, for a recompression and/or production phase, via inlet E of the adsorber.

In phase IV, the fixed flow is an outlet, by counterflow, from the adsorber inlet to volume, R, which receives the residual gas from desorption by the adsorber.

The cycle shown in FIG. 3 enables high productivity to be obtained concomitantly with supply, to the user station, of production gas at a pressure close to the maximum pressure of the cycle.

In this cycle, the free flows are nil during stages I and II, that is to say recompression is achieved first by the production gas from capacity, $C_2$, then by the compressed gaseous mixture for separation, which is supplied to the adsorber throughout stage III.

In stage III, the 'outleting' fixed flow is forwarded during the first two sub-stages to capacity, $C_2$, thus playing the role of an elution/repressurizing capacity and, during the last sub-stage, i.e. close to the high-pressure point in the cycle, it is forwarded to production capacity, $C_1$.

During phase IV, the free flow in the first two sub-stages is nil and, during the last sub-stage, it is a counterflow inlet from capacity, $C_2$, in order to ensure low-pressure elution of the adsorbent cycle.

The gas fraction held in capacity, $C_2$, for elution and recompression has a large storage pressure differential, capacity, $C_2$, being practically at the high pressure of the cycle when it is isolated (at the end of the second sub-stage of stage III).

The cycle shown in FIG. 4 differs from the previous one in that stage I includes, at least during the last sub-stage, a free flow entering by co-flow from volume G of the gaseous mixture for separation. This approach, enabled by counterflow co-pressurization by the gas from capacity $C_2$, in particular enables undersizing of rotary machine M and is particularly suitable for an installation with a two-way rotating machine.

In the variant with a free flow entering only during the last sub-stage of stage I, suitable for a conventional rotary machine, the latter works temporarily as a pressure reducer since the pressure in adsorber A is less than the pressure in volume G, which is typically atmospheric pressure, reducing the energy costs generated by operating the machine.

In the variant with a free flow entering by co-flow during all of stage I, suitable for a two-way rotating machine, the latter, under the effect of the pressure differential between volume G and the depressurized adsorber A, accelerates by itself to approach or achieve the nominal speed, thus freely recovering the corresponding kinetic energy.

In the cycle in FIG. 5, the recompression/production phase is restricted to stages I and II with production at end of stage II, stage III being a partial decompression stage, under co-flow, towards capacity $C_2$ (for subsequent elution at the low pressure of the cycle), recompression occurring, by production gas counterflow, during stage I, and thus with a more pure gas than that from $C_2$, used for elution, enabling a slight gain in the specific energy of the installation.

As in the cycle in FIG. 4, free inlet of the gaseous mixture for separation may be admitted, as co-flow, at the end of stage I.

The cycle in FIG. 6 is derived from that in FIG. 5 and is particularly suitable for a two-way rotating machine installation with, as in the cycle in FIG. 4, free inlet, as co-flow, of the gaseous mixture for separation throughout stage I and, in the present case, a free expansion flow, as co-flow, towards volume R throughout phase III, concomitantly with co-flow decompression towards capacity $C_2$. In this case, the two-way rotating machine turns one way for one half of the cycle and the other way for the other half of the cycle.

Although the present invention has been described in relation to specific implementation modes, it is not restricted to those modes, but is, on the contrary, suitable for modifications and variants that appear pertinent to professionals. In particular, to increase the range of use of an adsorber of given size, in the adsorber, two successive different sieves may be used, ensuring different performances for a fixed overall volume, and thus enabling a fairly large flexibility in the flow rate ranges, depending on the respective proportions of the sieves.

We claim:

1. A method for the separation of a gaseous mixture by adsorption under pressure variation between a cycle high pressure and a cycle low pressure in an adsorption unit including at least one adsorber containing at least one adsorbent and having an inlet and an outlet, using a repetitive cycle consisting of the following sequential successive stages:

stage I, repressurization from the low pressure of the cycle, stages II and III, during one of which the high pressure of the cycle is reached, stage IV, during which the low pressure of the cycle is reached, and including at least a sub-stage of depressurization and a subsequent sub-stage of purge/elution wherein each stage (I to IV) involves a fixed gas flow at one end of the adsorber and a free gas flow at the other end of the adsorber, the fixed flows addressing, in alternation, the inlet and outlet of the adsorber from one stage (I to IV) to the next.

2. The method of claim 1, wherein the fixed flows are inflows for stages I and II and outflows for stages III and IV.

3. The method of claim 2, wherein the high pressure of the cycle is reached in stage III.

4. The method claim 2, wherein the fixed flow is a co-current inflow for stage II and comes from a volume of the gaseous mixture to be separated.

5. The method of claim 4, wherein a fixed inflow coming from a capacity enters counter-currently the adsorber at stage I.

6. The method of claim 5, wherein said capacity is fed by a fixed co-current outflow, during stage III.

7. The method of claim 5, wherein said capacity is fed by a free co-current outflow, during at least the final sub-stage of stage II.

8. The method of claim 2, wherein stage IV includes a final sub-stage with a free inflow entering counter-currently and coming from a capacity.

9. The method of claim 8, wherein said capacity is fed by a fixed co-current outflow, during stage III.

10. The method of claim 2, wherein the free flow in stage III is not nil.

11. The method of claim 2, wherein the gaseous mixture consists essentially of nitrogen and oxygen.

12. The method of claim 1, wherein each stage (I to IV) is divided into at least a first and a second sub-stage for the free flow which is, for each first and second sub-stage, selected from the flow group consisting of in, out and practically nil flows.

13. The method of claim 12, wherein each stage (I to IV) includes at least a third sub-stage for the free flow.

14. The method of claim 1, wherein each sub-stage has substantially a same duration.

15. The method of claim 1, wherein the cycle has a duration which is less than 200 seconds.

16. A method for the separation of a gaseous mixture by adsorption under pressure variation in an adsorption apparatus including at least one adsorber containing at least one adsorbent and having an inlet and an outlet, using a repetitive cycle consisting of the following sequential successive stages:

stage I, repressurization from a low pressure of the cycle, stages II and III, during one of which a high pressure of the cycle is reached, stage IV, depressurization/purging, during which the low pressure of the cycle is reached, wherein each stage (I to IV) involves a fixed gas flow at one end of the adsorber and a free gas flow at the other end of the adsorber, the fixed flows addressing, in alternation, the inlet and outlet of the adsorber from one stage to the next, each stage divided into at least two sub-stages for the free flow, which is, for each sub-stage, selected from the flow group consisting of in, out and practically nil flows.

17. The method of claim 16, wherein the high pressure of the cycle is reached in stage III.

18. The method of claim 16, wherein the fixed flows are inflows for stages I and II and outflows for stages III and IV.

19. The method of claim 16, wherein each stage is divided into three sub-stages for the free flow.

20. The method of claim 16, wherein the fixed flow in stage II is an inflow from a volume of the gaseous mixture to be separated.

21. The method of claim 16, wherein the gaseous mixture to be separated is air and the fixed outflow in stage III is oxygen.

* * * * *